(12) United States Patent
Tanaka et al.

(10) Patent No.: US 6,713,726 B2
(45) Date of Patent: Mar. 30, 2004

(54) HEAT-SEALING METHOD AND APPARATUS FOR FIBER SHEETS

(75) Inventors: Yoshinori Tanaka, Kagawa (JP); Yasuhiko Kenmochi, Kagawa (JP)

(73) Assignee: Uni-Charm Corporation, Kawanoe (JP)

( * ) Notice: Subject to any disclaimer, the term of this patent is extended or adjusted under 35 U.S.C. 154(b) by 0 days.

(21) Appl. No.: 10/181,669

(22) PCT Filed: Jan. 12, 2001

(86) PCT No.: PCT/JP01/00162
§ 371 (c)(1),
(2), (4) Date: Jul. 17, 2002

(87) PCT Pub. No.: WO01/53586
PCT Pub. Date: Jul. 26, 2001

(65) Prior Publication Data
US 2003/0000934 A1 Jan. 2, 2003

(30) Foreign Application Priority Data
Jan. 19, 2000 (JP) .......................................... 2000-10483

(51) Int. Cl.$^7$ ................................................. B32B 7/04
(52) U.S. Cl. ....................... 219/244; 219/388; 219/469; 156/582; 156/555
(58) Field of Search ........................ 219/244, 469–471, 219/388; 492/46, 48, 30–31, 33; 156/582, 555, 583.1

(56) References Cited

U.S. PATENT DOCUMENTS

| | | | | |
|---|---|---|---|---|
| 1,228,191 | A | * 5/1917 | Dun Lany | .................. 219/469 |
| 1,624,029 | A | * 4/1927 | Whitcomb | .................. 156/555 |
| 3,671,709 | A | 6/1972 | Gidge | |
| 4,406,720 | A | 9/1983 | Wang et al. | |
| 5,425,981 | A | 6/1995 | Brüning et al. | |
| 5,735,984 | A | * 4/1998 | Hoff et al. | ................ 156/580.2 |
| 5,773,796 | A | * 6/1998 | Singer et al. | ................ 219/470 |
| 6,165,298 | A | 12/2000 | Samida et al. | |

FOREIGN PATENT DOCUMENTS

| | | | | |
|---|---|---|---|---|
| DE | 1934333 | 3/1966 | ............. | B21F/3/02 |
| DE | 2259203 | 6/1974 | ............. | D04H/1/54 |
| JP | 6-194985 | * 7/1994 | | |

* cited by examiner

*Primary Examiner*—John A. Jeffery
(74) *Attorney, Agent, or Firm*—Darby & Darby

(57) ABSTRACT

There is disclosed a heat-sealing method including: feeding a fusible fiber sheet (12) into the clearance between a pair of rolls (1, 5), at least one of which has sealing ridges (2, 6) of a predetermined pattern on its outer circumference; and heating and pressing the fiber sheet (12) with the sealing ridges (2, 6), to form fused portions corresponding to the pattern of the sealing ridges (2, 6), in the fiber sheet (12). An insulator (4) is disposed to cover the outer circumference of the rolls (1, 5), as lacking the sealing ridges. The insulator (4) is made of a material which has a lower thermal conductivity than that of the sealing ridges and which can be elastically contracted by the pressure of the rolls (1, 5). The fiber sheet (12) to be fed into the clearance between the rolls (1, 5) rotating is compressed by the insulator (4) to discharge its internal air and is then heated and pressed by the sealing ridges (2, 6) so that it is heat-sealed.

6 Claims, 5 Drawing Sheets

HEAT-SEALING METHOD AND APPARATUS FOR FIBER SHEETS

BACKGROUND OF THE INVENTION

1. Field of the Invention

The present invention relates to a heat-sealing method and a heat-sealing apparatus for fusing a fiber sheet of a bulky nonwoven fabric, a fiber web, a composite of a nonwoven fabric and a fiber web, a composite of a film and a fiber web, a composite of a film, a nonwoven fabric and a fiber web, or the like into a predetermined pattern.

2. Description of the Prior Art

A fiber sheet of a nonwoven fabric, a fiber web or the like may be partially fused and used as a cleaning sheet. In Unexamined Published Japanese Patent Application No. 11-235301, for example, there is disclosed a cleaning sheet which is manufactured by heat-sealing a fiber sheet, as prepared by overlapping a fiber web of long fibers opened from TOW on a nonwoven fabric, partially and by slitting the nonwoven fabric and the fiber web in the region between fused lines formed by heat-sealing. In this cleaning sheet, the fiber web can sweep dust easily with brush-shaped portions, each of which is located between one fused line and one slit, and the fiber web is effective to trap the dust or relatively large pieces of trash with remaining portions, each of which is located between two fused lines while having no slit therebetween.

The heat-sealing method of the prior art for partially fusing a relatively bulky fiber sheet such as a laminate of the nonwoven fabric and the fiber web is performed by using rolls, as shown in FIG. 7.

In the heat-sealing method shown in FIG. 7, a pair of rolls 31 and 32 are provided integrally with stealing ridges 31a and 32a of a predetermined pattern on their respective outer circumferences. These rolls 31 and 32 are heated to a temperature higher than the melting point of the fibers composing a fiber sheet 10 and are rotated in the directions of arrows.

The fiber sheet 10 is prepared by laminating a fiber web 12 of long fibers opened from TOW on a base material sheet 11 of a nonwoven fabric and/or a film. The fibers forming the base material sheet 11 and the fiber web 12 contain fusible fibers such as those of PET, PE or PP.

As the fiber sheet 10 is fed into the clearance between the rotating rolls 31 and 32, the fiber sheet is partially pressed and heated between the sealing ridges 31a and 32a of the rotating rolls 31 and 32 so that the fusible fibers are fused to form fused portions 13. These fused portions 13 are formed into a pattern identical to the pattern of the sealing ridges 31a and 32a.

The heat-sealing method using the rolls 31 and 32, as shown in FIG. 7, can perform the high-speed treatment when it is to fuse a less bulky nonwoven fabric or the like but is defective in that it has a poor fusing efficiency for a relatively bulky sheet such as the fiber sheet 10 including the fiber web 12 opened from TOW and is difficult to perform the high-speed treatment.

Specifically, the fibers, as opened from TOW, are in a crimped state so that the fiber web 12 has a low density and a high volume of voids. When this bulky fiber sheet 10 is fed into the clearance between the rolls 31 and 32 so that it is pressed between the sealing ridges 31a and 32a, the presence of the air in the voids in the fiber sheet 10 deteriorates the thermal conductivity in the fiber sheet 10 so that the fusible fibers take a time to be heated to a temperature higher than their melting point. Before the fiber sheet 10 is completely clamped, as shown in FIG. 7, by the sealing ridges 31a and 32a, more specifically, the heated air in the fiber sheet 10 will go out to deteriorate the efficiency for heating the fusible fibers to the melting point or higher.

In order to fuse the fusible fibers to form the fused portions 13, therefore, the speed of rotation of the rolls 31 and 32 has to be set at a low level so that the high-speed treatment cannot be made.

In order to eliminate this defect, it is conceivable to raise the temperature of the rolls 31 and 32 and to set the pressing forces of the rolls 31 and 32. With these settings, however, when the fiber sheet 10 is heat-sealed by the sealing ridges 31a and 32a, the fusible fibers in the fused portions 13 especially on the sealing surface side are fused out or are cut by the pressure so that the fused portions 13 easily become defective.

In the heat-sealing method using the rolls 31 and 32 shown in FIG. 7, on the other hand, the fiber sheet 10 is locally clamped between the sealing ridges 31a and 32a which are protruded from the two rolls 31 and 32. When the fiber sheet 10 has portions of different thicknesses or when the pattern of the sealing ridges 31a and 32a is formed, for example, into a V-shape or a curved shape, therefore, the fiber sheet 10 is wrinkled or offset, as clamped by the sealing ridges 31a and 32a, or the fiber sheet 10 or its fibers themselves, as opened from TOW, are meandered so that the fused portions 13 may be unable to have a precise pattern.

SUMMARY OF THE INVENTION

The invention has an object to provide a heat-sealing method and a heat-sealing apparatus for forming fused portions at a high speed even in a relatively bulky fiber sheet.

Another object of the invention is to provide a heat-sealing method and a heat-sealing apparatus for forming fused lines in a precise pattern, when the fiber sheet has portions of different thicknesses or when the fused portions have a V-shaped or curved pattern, by preventing the fiber sheet from being wrinkled or offset and the fiber sheet and its fibers themselves from being meandered.

According to an aspect of the invention, there is provided a heat-sealing method comprising: feeding a fusible fiber sheet into the clearance between a pair of rolls, at least one of which has sealing ridges of a predetermined pattern on its outer circumference; and heating and pressing the fiber sheet with the sealing ridges, to form fused portions corresponding to the pattern of the sealing ridges, in the fiber sheet, wherein an insulator is disposed to cover the outer circumference of the roll, as lacking the sealing ridges, and is made of a material which has a lower thermal conductivity than that of the sealing ridges and which can be elastically contracted by the pressure of the rolls; and wherein the fiber sheet to be fed into the clearance between the rolls rotating is compressed by the insulator to discharge its internal air and is then heated and pressed by the sealing ridges so that it is heat-sealed.

When the rolls are rotated and fed inbetween with a bulky fiber sheet, according to the invention, the fiber sheet is clamped by the insulator to expel the air from the fiber sheet to the outside, so that it is clamped by the sealing ridges when the air is expelled to a considerable extent. At the instant when the fiber sheet is clamped by the sealing ridges, therefore, the void volume in the fiber sheet is reduced so that the fusible fibers in the fiber sheet are quickly heated by the heat of the sealing ridges. Therefore, the reliable heat-sealing can be ensured even if the rotating speed of the rolls is increased to raise the feeding rate of the fiber sheet.

On the other hand, since the bulky fiber sheet, as formed of a fibrous layer, is clamped by the sealing ridges after it was crushed by the insulators to some extent, even if the fiber sheet has the different thicknesses or if the fused portions have the V-shaped or curved pattern, the fiber sheet is neither wrinkled or offset, nor meandered are the fiber sheet or the fibers themselves, so that the fused portions formed can have a precise pattern without going out of position.

According to another aspect of the invention to be employed in the aforementioned heat-sealing method, there is provided a heat-sealing apparatus comprising a pair of rolls for heating and pressing a fusible fiber sheet to form fused portions of a predetermined pattern, wherein at least one of the paired rolls is provided with sealing ridges on its outer circumference for forming the fused portions of the predetermined pattern and with an insulator covering the region other than the sealing ridges; and wherein the insulator is made of a material which has a lower thermal conductivity than that of the sealing ridges and which can be elastically contracted by the pressure of the rolls.

In the heat-sealing method and the heat-sealing apparatus, the insulator preferably has a thickness, when unexposed to the pressure of the rolls, equal to or larger than the height of the sealing ridges. Moreover, the insulator preferably has a thickness, when exposed to the pressure of the rolls being pressed, equal to or smaller than the height of the sealing ridges.

PREFERRED EMBODIMENTS OF THE INVENTION

Figure 1:
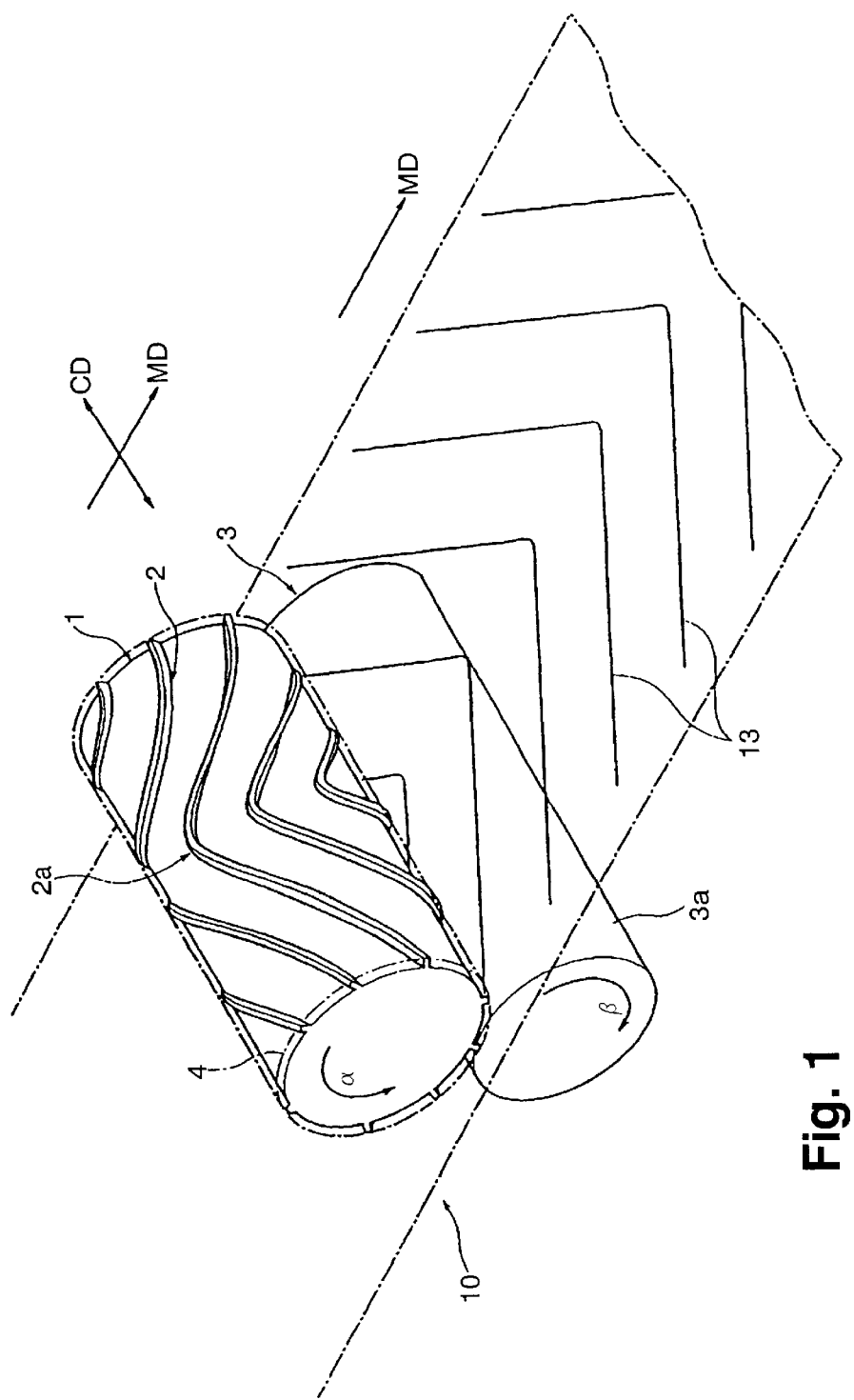
FIG. 1 is a perspective view of a portion of a heat-sealing apparatus for executing a heat-sealing method according to one embodiment of the invention.
Figure 2:
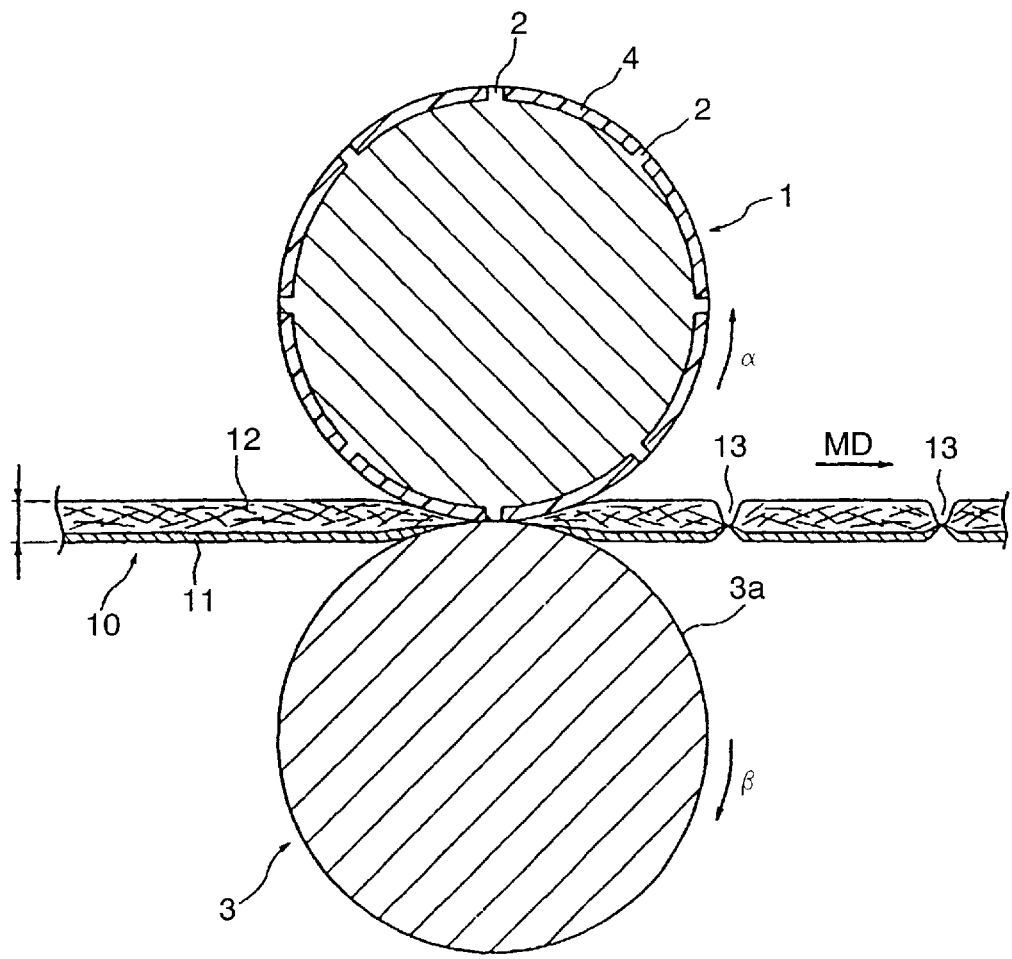
FIG. 2 is a sectional view showing the heat-sealing method of FIG. 1.
Figure 3:
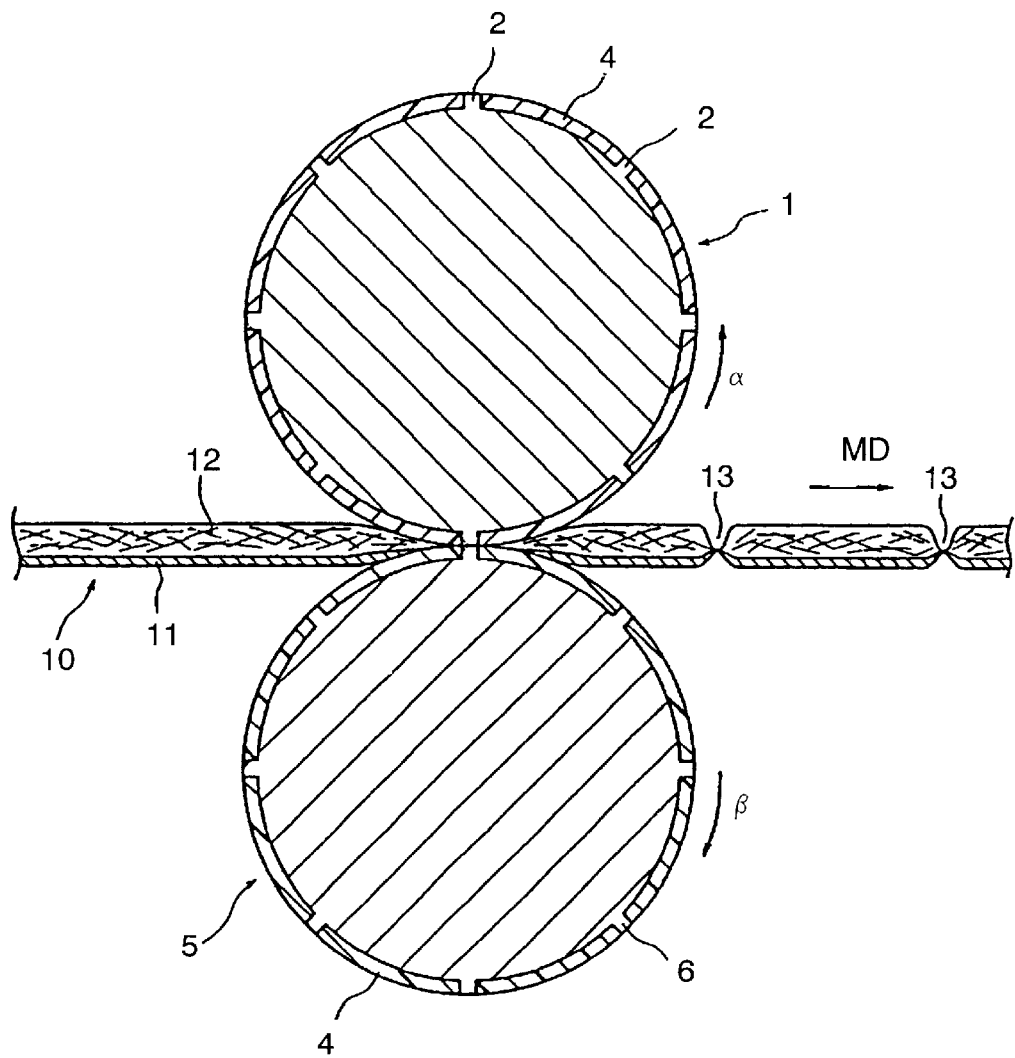
FIG. 3 is a sectional view showing a heat-sealing method according to another embodiment.

FIG. 1 is a perspective view of a heat-sealing apparatus for executing a heat-sealing method according to one embodiment of the invention; FIG. 2 is a sectional view showing a step of forming fused portions in a fiber sheet by the heat-sealing apparatus of FIG. 1; and FIG. 3 is a sectional view showing another embodiment of the heat-sealing method and the heat-sealing apparatus.

In FIG. 1, there are shown a pair of rolls 1 and 3. These two rolls 1 and 3 are made of a metallic material having a high thermal conductivity such as steel or an alloy. Of these, one is the pattern roll 1 which is integrally provided with sealing ridges 2 on its outer circumference. These sealing ridges 2 are formed circumferentially in a plurality of patterns at a predetermined interval and are patterned into a shape of letter "V", the crests 2a of which are directed forward (i.e., in the direction α) of the rotating direction of the pattern roll 1.

As shown in FIG. 2, the outer circumference of the pattern roll 1 is covered with an insulator 4 at its portions lacking the sealing ridges 2. This insulator 4 is made of a material having a sufficiently lower thermal conductivity than that of the pattern roll 1, a heat resistance and an elasticity, such as a foamed member made of a heat resisting resin, e.g., silicone, or heat resisting rubber, e.g., silicone rubber.

The other is the anvil roll 3, the outer circumference 3a of which is a smooth cylindrical face.

Alternatively, this anvil roll 3 is replaced by a pattern roll 5, as shown in FIG. 3. The pattern roll 5 of FIG. 3 is integrally provided with sealing ridges 6 on its outer circumference. These sealing ridges 6 have a pattern shape symmetric to the sealing ridges 2 formed on the outer circumference of the pattern roll 1. The outer circumference of the pattern roll 5 is also provided with the insulator 4 at its portions lacking the sealing ridges 6.

A bulky fiber sheet 10 is fed and heat-sealed either between the pattern roll 1 and the anvil roll 3 or between the pattern roll 1 and the pattern roll 5. The bulky fiber sheet 10 is prepared by laminating a fiber web 12 over a nonwoven fabric 11.

The nonwoven fabric 11 for a base material sheet is exemplified by spun bond, thermal bond or spun lace nonwoven fabric and contains fusible fibers such as those of PET, PE or PP, or their composite fibers. Alternatively, the nonwoven fabric 11 may be replaced by a fusible film of PET, PE or PP, or a laminate of the nonwoven fabric 11 and the film may be employed as the base material sheet.

The fiber web 12 is a layer of either long fibers opened from TOW or fibers torn from a film, as called the "splityarns", and these fibers extend mainly in the feed direction (MD) of the fiber sheet 10. The fiber web 12 also contains the fusible fibers such as those of PET, PE or PP, or their composite fibers.

The fiber sheet 10 has a low density with respect to the "METSUKE" (basis weight) and is bulky. Especially the long fibers, as opened from TOW, are crimped. On the other hand, the split yarns are not generally crimped but could be crimped for use. The fiber web 12 made of those materials is bulky and has a large void volume.

As the fiber sheet 10 is fed into the clearance between the rolls rotating in the directions α and β, it is clamped either between the insulator 4 of the pattern roll 1 and the outer circumference 3a of the anvil roll 3 (as shown in FIG. 2) or between the insulator 4 of the pattern roll 1 and the insulator 4 of the pattern roll 5 (as shown in FIG. 3) so that it is vertically crushed. Therefore, the air in the fiber sheet 10 is discharged before it is clamped by the sealing ridges 2 or between the sealing ridges 2 and 6. When the sealing ridges 2 or the sealing ridges 2 and the sealing ridges 6 clamp the fiber sheet 10, the void volume in the fiber sheet 10 is reduced to improve the thermal conductivity in the sheet.

Thus, the fusible fibers in the nonwoven fabric 11 and the fiber web 12 can be heated for a short time to a temperature over a melting point so that fused portions 13 can be formed shortly and reliably in the fiber sheet 10. Therefore, the rotating speed of the rolls 1 and 3 or the rolls 1 and 5 can be increased to increase the heat-sealing rate.

On the other hand, it is unnecessary to raise the temperature of the rolls more than necessary and the pressure between the rolls more than necessary. As a result, the fused portions 13 can be stably formed in the fiber sheet 10 so that the fused portions 13 are hardly made defective by the fusing or press-cutting of the fusible fibers on the seal surface.

Figure 7:
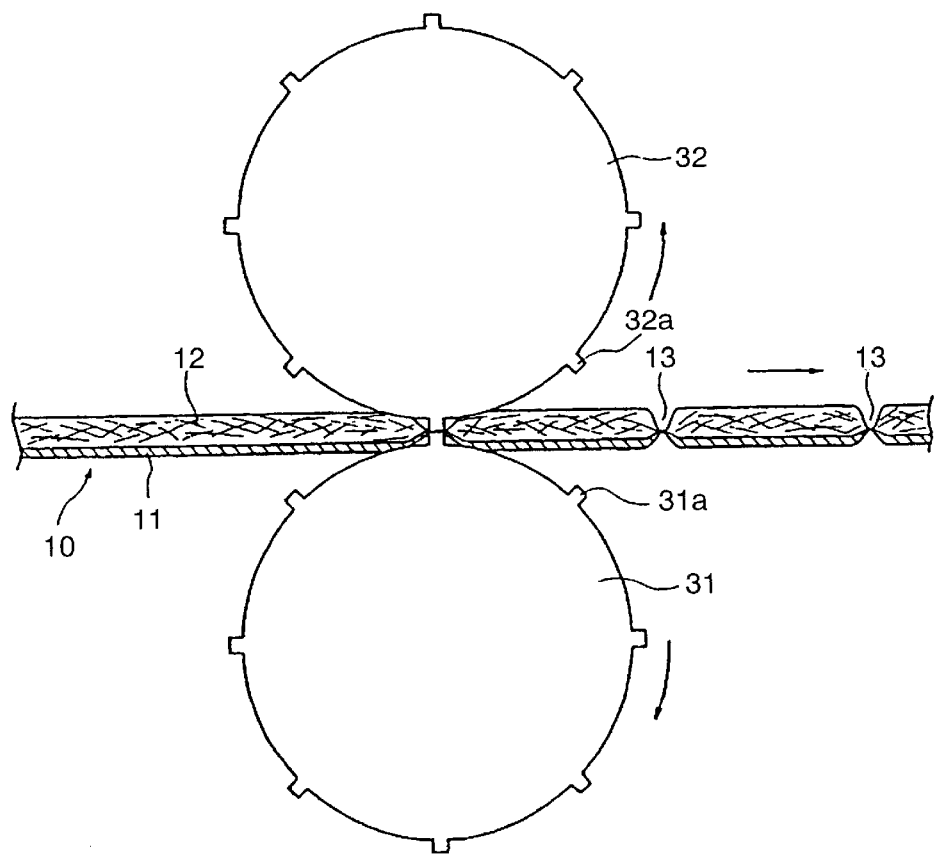
FIG. 7 is a sectional view showing a heat-sealing method of the prior art.

When the fused portions 13 have the V-shaped pattern, as shown in FIG. 1, or a curved pattern, and when the fiber sheet 10 has portions of different thicknesses, on the other hand, the fiber sheet 10 is wrinkled or offset, or the fiber sheet 10 or the fiber web 12 is easily meandered, if the fiber sheet is fed by clamping it only by the sealing ridges, as shown in FIG. 7. If the pattern rolls are provided with the insulators 4 on their outer circumferences, as shown in FIGS. 2 and 3, however, the fiber sheet 10 is clamped, compressed and restrained by the insulators 4 and then fed to the sealing ridges so that its feed is stabilized. Therefore, the fiber sheet 10 is hardly wrinkled or offset, and the fiber web 12 is hardly meandered when fed.

Therefore, the pattern of the fused portions 13, as shown in FIG. 1, can be reliably formed without going out of position.

Figure 4:
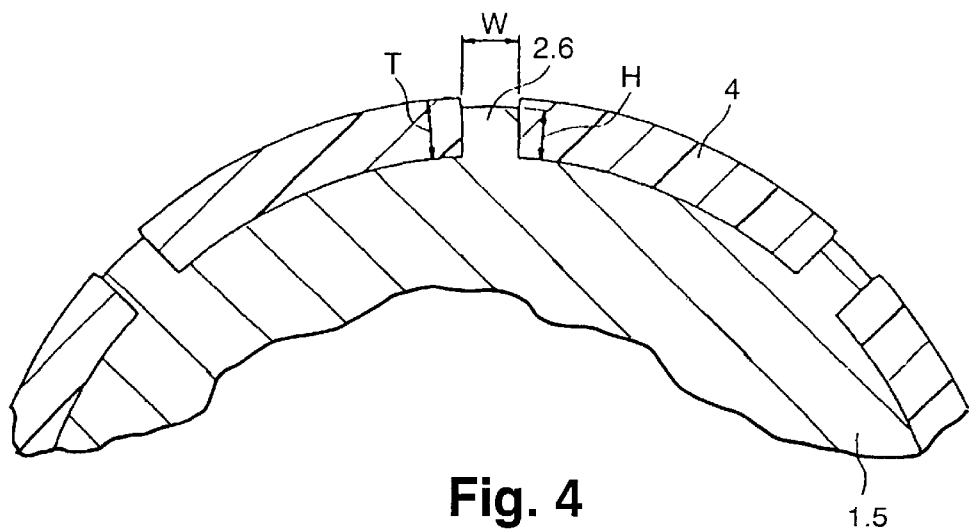
FIG. 4 is an enlarged sectional view of a pattern roll.

FIG. 4 shows the pattern rolls 1 and 5 in an enlarged scale. The thickness T of the insulator 4 is preferred, while it is not receiving the pressure between the rolls, to be equal to or larger than the height H of the sealing ridges 2 or 6. On the other hand, the upper limit of the thickness T is preferred to have such a size as to contract to the height H or less of the sealing ridges while the insulator 4 is receiving the pressure between the rolls. On the other hand, if the thickness T is larger than the height T when not pressed between the rolls, the insulator 4 is preferred to have such a modulus of elasticity as to contract, when pressed between the rolls, to a thickness T smaller than the height H of the sealing ridges. Even if the thickness T of the insulator 4 is smaller than the height H of the sealing ridges when not pressed between the rolls, however, it raises no serious problem if the insulator 4 is so thick as can push the fiber sheet 10 to discharge the internal air.

Moreover, the relation between the circumferential width W of the sealing ridges 2 or 6 and the thickness T0 of the fiber sheet 10 may be set in the following manner. When the fiber sheet 10 is fed into the clearance between the rotating rolls, it receives the pressure of the insulator 4 so that its fiber layer is clamped in advance to discharge the internal air, and then receives the clamping pressure of the sealing ridges 2 and 6.

Figure 5:
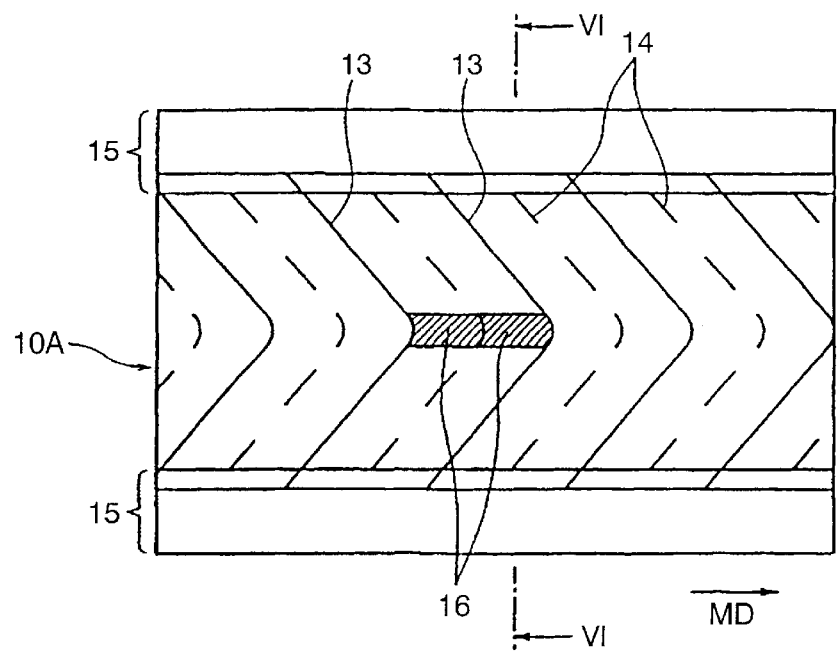
FIG. 5 is a top plan view of a cleaning sheet fused by the heat-sealing method of the invention.
Figure 6:
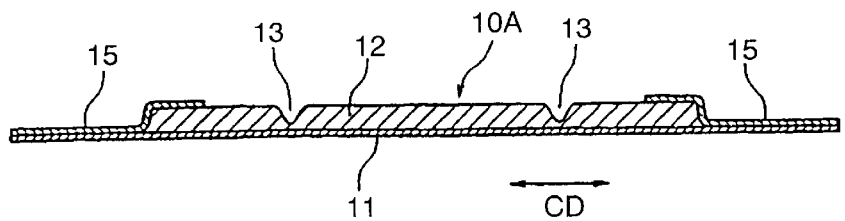
FIG. 6 is a sectional view taken along line VI—VI of FIG. 4.

FIG. 5 is a top plan view showing a cleaning sheet 10A exemplifying the fiber sheet 10 which has the fused portions 13 formed by the heat-sealing method using the heat-sealing apparatus shown in FIGS. 1 to 3, and FIG. 6 is a sectional view taken along line VI—VI of FIG. 5.

In this cleaning sheet 10A, as hereinbefore described, the fiber web 12 of long fibers opened from TOW is laminated over the nonwoven fabric 11 (or a film or a laminate of a film and a nonwoven fabric). The cleaning sheet 10A is provided with holding sheets 15 and 15 on the two side portions in the widthwise direction (CD). These holding sheets 15 and 15 are made similar to the nonwoven fabric 11. The fiber web 12 is sandwiched at its two side portions between the nonwoven fabric 11 and the holding sheets 15 and 15, and the nonwoven fabric 11 and the holding sheets 15 and 15 are adhered by a hot-melt adhesive or fused and jointed.

This cleaning sheet 10A is provided with the fused portions 13 of the V-shaped pattern by the heat-sealing method, as shown in FIGS. 1 to 3, and at which the nonwoven fabric 11 and the fiber web 12 are jointed. Between the fused portions 13 and 13, moreover, there are formed slits 14 which are arranged parallel to the V-shape pattern at intervals. These slits 14 are formed by cutting through the nonwoven fabric 11 and the fiber web 12 together. Moreover, the fibers composing the fiber web 12 are napped, if necessary. As a result, in a region 16 hatched in FIG. 5, the fibers forming the fiber web 12 are clipped at the fused portions 13 and are released at the slit 14. Therefore, the cut fibers extending from the fused portion 13 to the slit 14 form a brush-shaped portion. Such brush-shaped portions of the fiber web are formed all the regions that are sandwiched between the fused portions 13 and the slits 14.

In this cleaning sheet 10A, the brush-shaped portions can wipe off dust or the like. In the remaining regions lacking the slits 14, the fiber layer extends in a bridge shape between the fused portions 13 and 13 adjoining in the MD so that it can trap the dust or relatively large pieces of trash between the fibers.

Here, the present invention should not be limited to the heat-sealing of the aforementioned composite fiber sheet of the nonwoven fabric and the fiber web but could be applied to the heat-sealing of only the fiber web or the nonwoven fabric, which is bulky and has a low density but a large void volume, such as an air-through nonwoven fabric. On the other hand, the fused portions 13 should not be limited to the continuous line shape, as shown in FIG. 1, but could also be practiced by dotted sealing embosses.

As has been described hereinbefore, according to the invention, even the bulky fiber sheet having the large void volume can be heat-sealed at a high speed by using the rolls. Even if the fiber sheet has portions of different thicknesses or if the fused portions have the V-shaped pattern or a curved shape, the fiber sheet can be reliably heat-sealed while being fed into the clearance between the rolls so that the fused portions can be formed without fail.

Here, 'comprises/comprising' when used in this specification is taken to specify the presence of stated features, integers, steps or components but does not preclude the presence or addition of one or more other features, integers, steps, components or groups thereof.

Although various exemplary embodiments have been shown and described, the invention is not limited to the embodiments shown. Therefore, the scope of the invention is intended to be limited solely by the scope of the claims that follow.

What is claimed is:

1. A heat-sealing method comprising the steps of:

feeding a fusible fiber sheet composed of a nonwoven fabric and a layer of long fibers opened from tow into a clearance between a pair of rolls, at least one of which has sealing ridges of a predetermined pattern on its outer circumference; and heating and pressing said fiber sheet with said sealing ridges, to form fused portions corresponding to the pattern of said sealing ridges, in said fiber sheet, wherein an insulator is disposed to cover the outer circumference of said rolls, as lacking said sealing ridges, and is made of a material which has a lower thermal conductivity than that of said sealing ridges and which can be elastically contracted by a pressure of said rolls, and said insulator has a thickness, when unexposed to the pressure of said rolls, which is larger than a height of said sealing ridges; and wherein when fed into the clearance between said rolls when rotating, the fiber sheet is compressed by said insulator to discharge its internal air and is then heated and pressed by said sealing ridges so that it is heat-sealed.

2. The heat-sealing method as set forth in claim 1, wherein said insulator has a thickness, when exposed to the pressure of said rolls being pressed, equal to or smaller than the height of said sealing ridges.

3. The heat-sealing method as set forth in claim 1, wherein the sealing ridges are circumferentially arranged at a predetermined interval, wherein the individual sealing ridges extend in a "V" shaped manner having crests directed forwardly in a rotating direction of the roll.

4. A heat-sealing apparatus comprising a pair of rolls for heating and pressing a fusible fiber sheet composed of a nonwoven fabric and a layer of long fibers opened from tow to form fused portions of a predetermined pattern, wherein at least one of said paired rolls is provided with sealing ridges on its outer circumference for forming said fused portions of the predetermined pattern and with an insulator covering the region other than said sealing ridges; and wherein said insulator is made of a material which has a lower thermal conductivity than that of said sealing ridges and which can be elastically contracted by a pressure of said rolls, and said insulator has a thickness, when unexposed to the pressure of said rolls, larger than a height of said sealing ridges.

5. The heat-sealing apparatus as set forth in claim 4, wherein said insulator has a thickness, when exposed to the pressure of said rolls being pressed, equal to or smaller than the height of said sealing ridges.

6. The heat-sealing apparatus as set forth in claim 4, wherein the sealing ridges are circumferentially arranged at a predetermined interval, wherein the individual sealing ridges extend in a "V" shaped manner having crests directed forwardly in a rotating direction of the roll.

* * * * *